(No Model.)  2 Sheets—Sheet 1.
W. PURDON.
SASH HOLDER.

No. 487,155. Patented Nov. 29, 1892.

Witnesses  Inventor
Wm Purdon

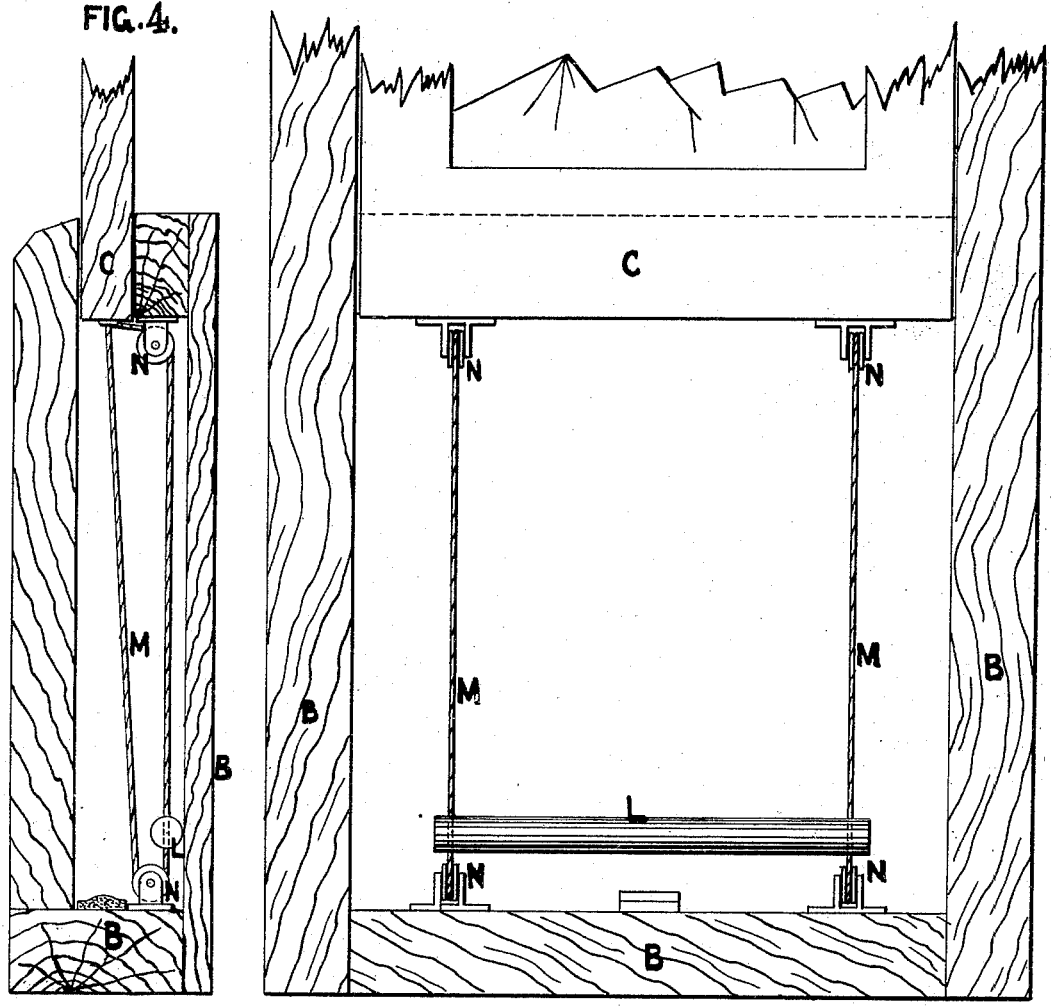

UNITED STATES PATENT OFFICE.

WILLIAM PURDON, OF HULL, ENGLAND.

SASH-HOLDER.

SPECIFICATION forming part of Letters Patent No. 487,155, dated November 29, 1892.

Application filed April 6, 1892. Serial No. 428,067. (No model.) Patented in England September 10, 1891, No. 15,319.

*To all whom it may concern:*

Be it known that I, WILLIAM PURDON, a subject of the Queen of Great Britain, residing at Hull, in the county of York, England, have invented new and useful Improvements in Railway and other Carriage Window-Fasteners, (for which I have obtained a patent in Great Britain, No. 15,319, dated September 10, 1891,) of which the following is a specification.

This invention has for its object to provide novel means for holding the window-sashes of railway and other carriages for the purpose of dispensing with straps, preventing rattling, and excluding dust.

To accomplish this object my invention involves the features of construction and the combination or arrangement of devices hereinafter described and claimed, reference being made to the accompanying drawings, in which—

Figure 1:
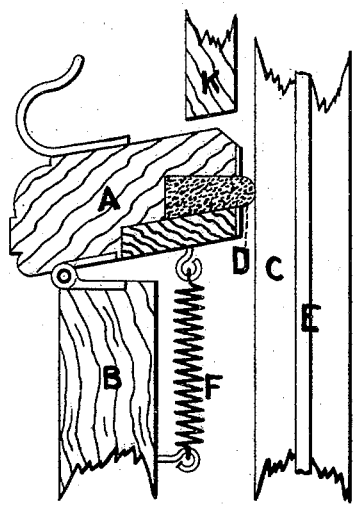
Figure 2:
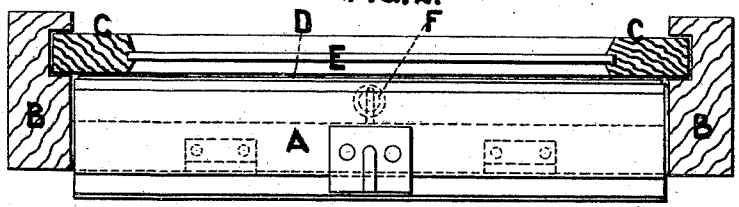
Figure 3:
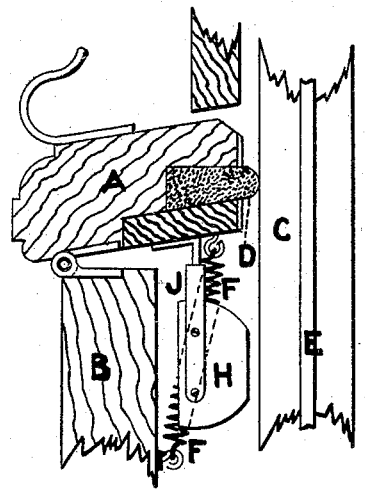

Figure 1 is a detail sectional view showing a portion of a carriage-door and window-sash with my invention applied thereto. Fig. 2 is a horizontal sectional plan view of the same. Fig. 3 is a view similar to Fig. 1, showing a brake for retarding the descent of the window-sash. Fig. 4 is a detail vertical sectional view showing a modified construction of brake, and Fig. 5 is a sectional front elevation of the modification exhibited by Fig. 4.

In the drawings, the letter A indicates a rocking board or wedge hinged or pivoted to a carriage-door B in front of the window-sash and provided at one edge with a friction-pad D, of india-rubber or other suitable or pliable substance, so as to allow the window E to be freely raised, and yet on ceasing to raise the window the wedge grips it and retains it in any required position. Then by lifting the wedge or pulling back its hook the window is released and falls. A spiral or other spring F keeps the wedge in its working position. An ordinary rubber block may be placed at the bottom for the window to drop upon and break its fall; also, a brake may be fixed under the wedge-grip, consisting of a piece of india-rubber or other suitable substance H, attached to a bracket J at each side of the window, so that after pulling back the wedge and releasing the window the brake comes in contact with each side of the window C and so breaks its descent; or a counterbalance may be employed (see Figs. 4 and 5) consisting of a weight L, attached to cords, wires, or chains M or the like, such cords being attached to the bottom of each side of the window or slide C, and passing over suitable pulleys or runners N, attached to the frame of the door B, effectually balances and prevents the window from being brought down violently, it being almost noiseless. Any other suitable means of breaking its descent may be used.

A stop or guard K prevents the pivoted or hinged wedge A from damage by violent usage.

What I claim as the invention, and desire to secure by Letters Patent, is—

1. The combination, with a stationary part B and a vertically-sliding window-sash C, of a board A, having at its inner edge a friction-pad D and hinged near its outer edge to the stationary part in front of the window-sash and rocking or oscillating in a vertical plane on its hinged attachment, so that it permits the sash to rise, but automatically engages the sash to prevent its descent, a spring connecting the rocking board with the carriage-door to keep said board in engagement with the sash, and mechanism which retards the descent of the sash when the latter is released from contact with the hinged board, substantially as described.

2. The combination, with a stationary part B and a vertically-sliding window-sash C, of a board A, having at its inner edge a friction-pad D and hinged near its outer edge to the stationary part in front of the window-sash and rocking or oscillating in a vertical plane on its hinged attachment, pulleys or runners attached to the stationary part B, cords attached to the sash and passing over said pulleys or runners, and a counterpoise attached to said cords, substantially as described.

In witness whereof I hereunto affix my signature.

WM. PURDON.

Witnesses:
LOUIS E. APPOX,
    *Manager.*
GORDON B. DANIELS.